(12) United States Patent
Wakayama et al.

(10) Patent No.: US 9,004,638 B2
(45) Date of Patent: Apr. 14, 2015

(54) COLOR MEASURING APPARATUS, PRINTING APPARATUS AND BACKING PLATE

(71) Applicant: Canon Kabushiki Kaisha, Tokyo (JP)

(72) Inventors: Naoki Wakayama, Kawasaki (JP); Ryohei Maruyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/796,064

(22) Filed: Mar. 12, 2013

(65) Prior Publication Data

US 2013/0257970 A1    Oct. 3, 2013

(30) Foreign Application Priority Data

Mar. 27, 2012    (JP) ................................. 2012-071291

(51) Int. Cl.
| | |
|---|---|
| B41J 29/393 | (2006.01) |
| G01J 3/46 | (2006.01) |
| G01J 3/50 | (2006.01) |
| G01J 3/02 | (2006.01) |
| G01J 3/52 | (2006.01) |
| H04N 1/60 | (2006.01) |
| G01J 3/10 | (2006.01) |

(52) U.S. Cl.
CPC .................. *G01J 3/50* (2013.01); *G01J 3/0267* (2013.01); *G01J 3/524* (2013.01); *H04N 1/6044* (2013.01); *G01J 3/10* (2013.01)

(58) Field of Classification Search
CPC ........................................................ G01J 3/46
See application file for complete search history.

(56) References Cited

U.S. PATENT DOCUMENTS

| | | | |
|---|---|---|---|
| 2008/0082287 A1* | 4/2008 | Kobayashi et al. | 702/127 |
| 2008/0252948 A1* | 10/2008 | Onishi | 358/504 |
| 2012/0026499 A1* | 2/2012 | Tanaka | 356/402 |
| 2012/0194588 A1* | 8/2012 | Kasai | 347/14 |

FOREIGN PATENT DOCUMENTS

| | | | |
|---|---|---|---|
| JP | 2006068907 A | * | 3/2006 |
| JP | 2008-275587 A | | 11/2008 |

OTHER PUBLICATIONS

Machine generated English translation of JP2008-275587 to Totsuka, "Colorimetric Method/Device"; obtained via http://www19.ipdl.inpit.go.jp/PA1/cgi-bin/PA1DETAIL on Jul. 24, 2014; 16pp.*

* cited by examiner

*Primary Examiner* — Shelby Fidler

(74) *Attorney, Agent, or Firm* — Fitzpatrick, Cella, Harper & Scinto

(57) ABSTRACT

The present invention provides a color measuring apparatus and a printing apparatus that enable the user to easily keep a backing plate. A color measuring apparatus includes a holder on which a backing plate is capable of being attached, the backing plate having a white portion and a black portion, and a sensor for measuring color patterns on a sheet on the backing plate. Either one of the white portion and the black portion faces the sensor, depending on the attached state of the backing plate on the holder.

6 Claims, 16 Drawing Sheets

COLOR MEASURING APPARATUS, PRINTING APPARATUS AND BACKING PLATE

BACKGROUND OF THE INVENTION

1. Field of the Invention

The present invention relates to a color measuring apparatus, a printing apparatus and a backing plate, and more particularly, relates to a color measuring apparatus that measures color using a backing plate.

2. Description of the Related Art

An inkjet printing apparatus is sometimes equipped with color measuring functionality for color correction. When measuring color with a printing apparatus having color measuring functionality, color patterns are printed onto a sheet, and color information for the color patterns is measured using a color measuring device. The color of print data on a monitor is compared on the basis of the colorimetric data, and the comparison results are applied to the next printing, thus making it possible to obtain desired color reproduction.

In order for a color measuring device to measure color with high precision, an underlay called a backing plate may be disposed on the back side of sheet opposite the side where color is measured. By disposing a backing plate, it is possible to measure color patterns with high precision, and as a result, take accurate measurements of color information. For example, it is possible to keep the color of a paper discharge guide disposed with the backing plate from showing through the sheet and making it difficult to take accurate measurements of color information for the color patterns.

The color of a backing plate is defined by ISO as a white backing or a black backing. Such backing plates may be attached or removed at an attachment position by the magnetic force of a magnet. Consequently, it is possible for the user to change and use multiple backing plates with different colors.

Japanese Patent Laid-Open No. 2008-275587 discloses a technique of using a color measuring device to measure the color of a backing plate and determine the color of the attached backing plate.

With the color measuring device described in Japanese Patent Laid-Open No. 2008-275587, a white backing plate and a black backing plate are provided separately. For this reason, the user is required to keep the backing plate not in use. Additionally, it is necessary to keep the backing plate such that the backing plate does not become warped. This is because if the backing plate warps, it may not be possible to measure color with high precision.

Particularly, backing plates used in a printing apparatus that prints large-format sheets become longer in correspondence with the width of the sheet. Consequently, it may be difficult to keep particularly long backing plates. Also, long backing plates may become warped depending on how the backing plates are placed, particularly when kept for long periods. If a backing plate warps, the distance between a sheet disposed on the backing plate and the color measuring sensor is no longer constant, and it may not be possible to measure color with high precision.

SUMMARY OF THE INVENTION

Being devised in light of the above points, the present invention provides a color measuring apparatus and a printing apparatus that enable the user to easily keep a backing plate.

According to the present invention, a color measuring apparatus is provided with a holder on which a backing plate is capable of being attached, the backing plate having a white portion and a black portion, and a sensor for measuring color patterns on a sheet on the backing plate, wherein, in accordance with an attached state of the backing plate on the holder, the sensor faces either one of the white portion and the black portion.

According to the present invention, since a white portion and a black portion are formed on a single backing plate, the burden of the user keeping the unused backing plate as in the past becomes unnecessary. Also, the problem of a backing plate warping in the case of keeping an unused backing plate for a long period as in the past is also resolved.

Further features of the present invention will become apparent from the following description of exemplary embodiments (with reference to the attached drawings).

DESCRIPTION OF THE EMBODIMENTS

Hereinafter, embodiments of the present invention will be described in detail and with reference to the drawings.

(First Embodiment)

Figure 1:
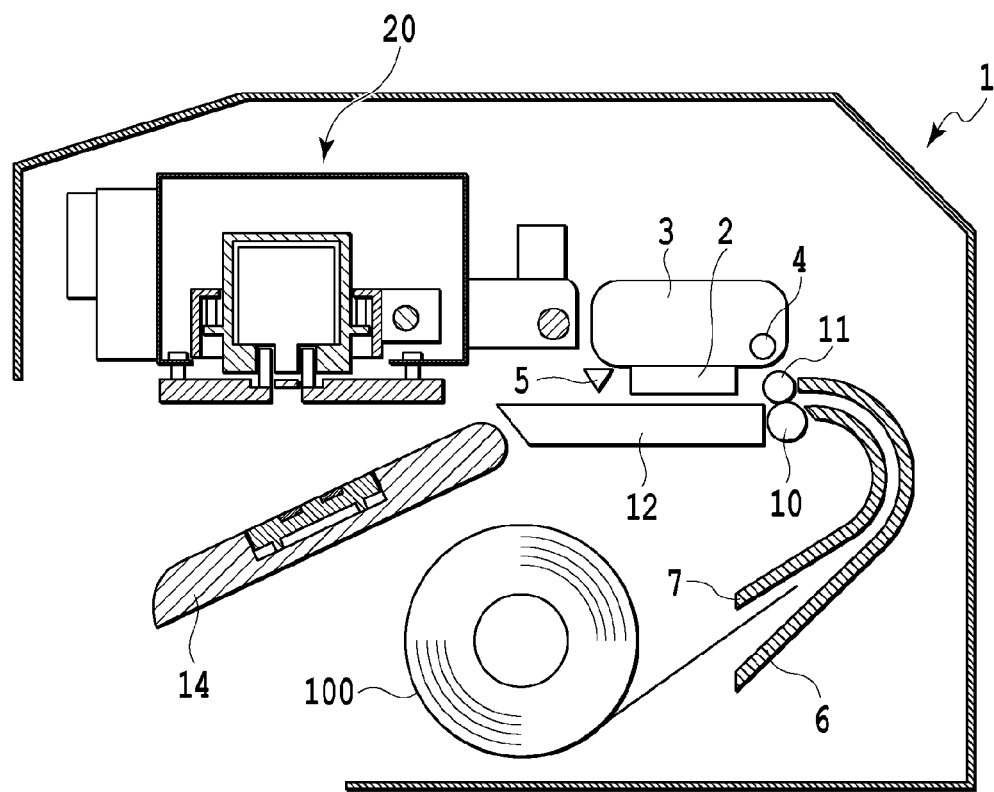
FIG. 1 is a cross-section view schematically illustrating a printing apparatus equipped with a color measuring apparatus according to the first embodiment.

FIG. 1 is a cross-section view schematically illustrating an inkjet printing apparatus having a color measuring apparatus according to the present embodiment. Roll paper 100, in which a sheet is wound in a roll, is held in the inkjet printing apparatus 1. The roll paper 100 is sent downstream along a sheet conveying path formed by an outer guide 6 and an inner guide 7. When the leading edge of the roll paper 100 reaches a nip between a conveying roller 10 and a pinch roller 11, the roll paper 100 is held between the conveying roller 10 and the pinch roller 11, and conveyed onto a platen 12 disposed at a position facing a print head 2 of an image printing unit.

The print head 2 prints onto the roll paper 100 conveyed to the image printing unit. The image printing unit includes the print head 2, a carriage 3 on which the print head 2 is mounted, and the platen 12 disposed facing the print head 2. The carriage 3 on which the print head 2 is mounted is slidably supported along a carriage shaft 4 and a guide rail (not illustrated). After printing with a single-line scan that scans the carriage 3 forward or backward, the roll paper 100 is fed by the conveying roller 10 and the pinch roller 11 in the conveying direction by a given pitch, and the carriage 3 is once again moved to print the next line. The printed portion of the roll paper 100 is conveyed towards a paper discharge guide 14. By repeating the above, an image is printed over an entire page.

When an image is finished printing, a color measuring region of the printed portion of the roll paper 100 is conveyed to a given color measuring position by the conveying roller 10 and the pinch roller 11. After that, color is measured in the color measuring region of the printed portion of the roll paper 100 by a color measuring apparatus 20. When color measurement is finished for all color measuring regions, the roll paper 100 is conveyed to a given cutting position, and is cut by a cutter 5. The cut roll paper 100 is delivered into a discharge basket (not illustrated) from the paper discharge guide 14.

Figure 2:
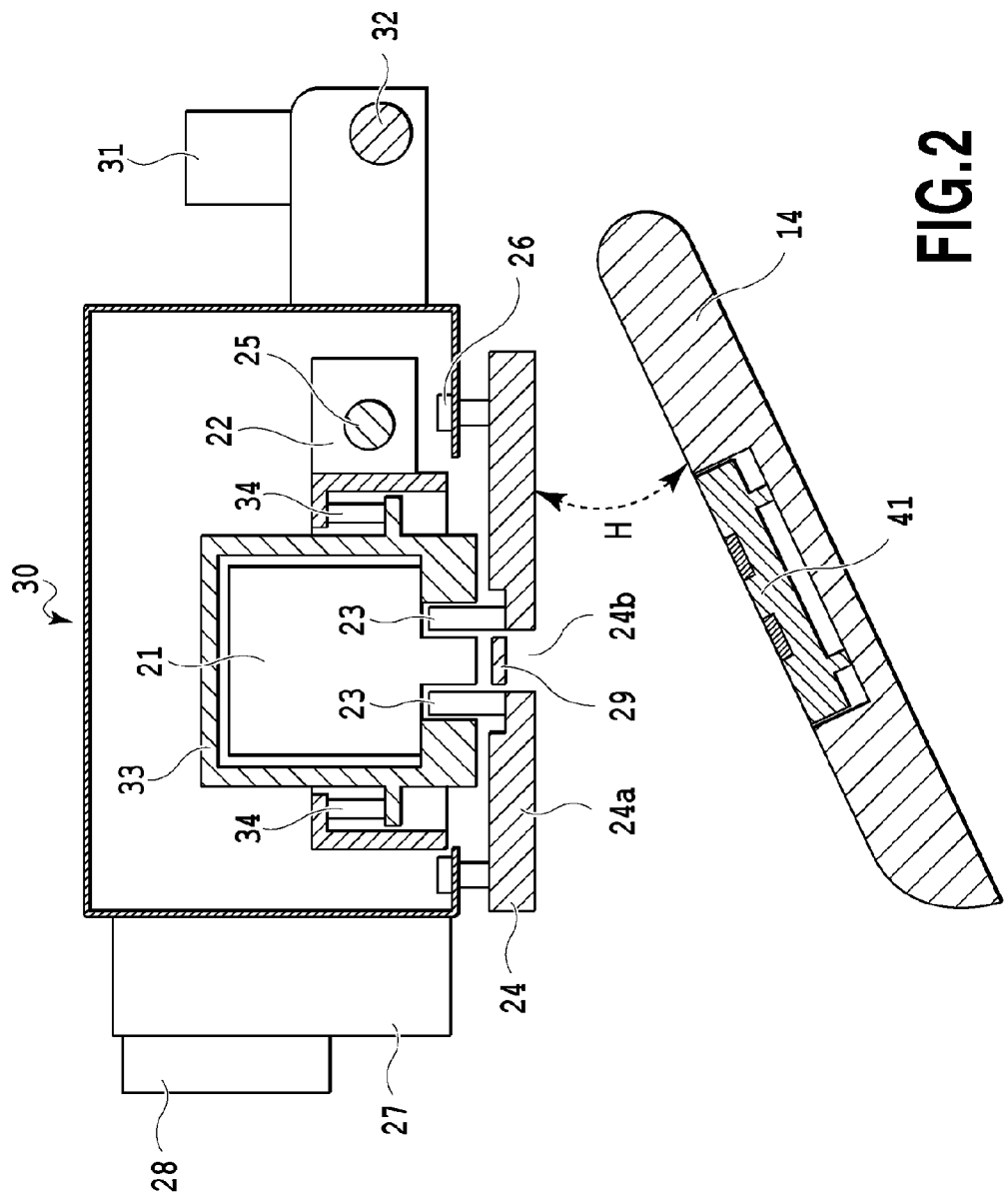
FIG. 2 is a cross-section view illustrating a state in which a color measuring unit is retracted.
Figure 3:
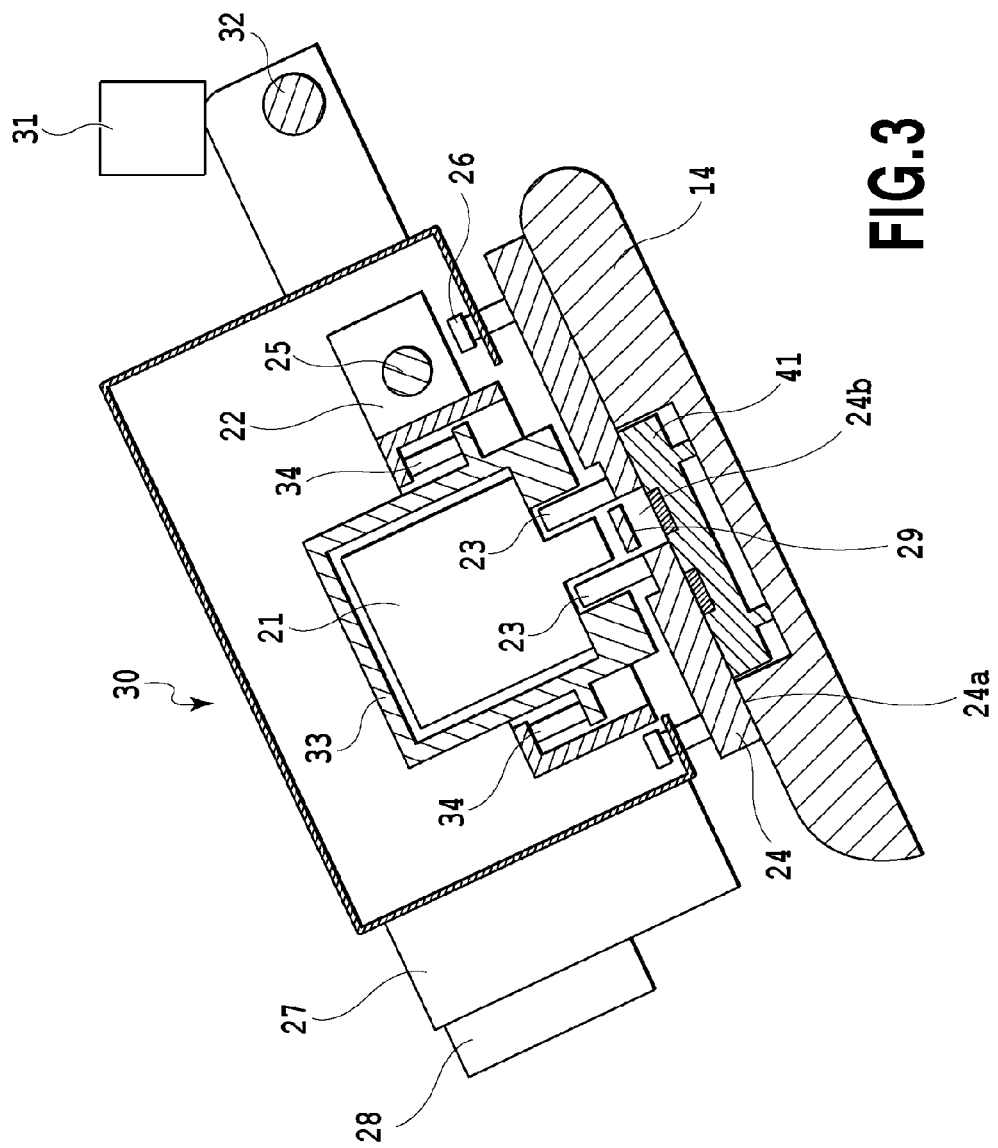
FIG. 3 is a cross-section view illustrating a state in which a color measuring unit is measuring color.

FIG. 2 is a cross-section view schematically illustrating a state in which the color measuring unit in a color measuring apparatus according to the present embodiment is retracted from the paper discharge guide 14. Also, FIG. 3 is a cross-section view schematically illustrating the color measuring unit in a color measuring apparatus according to the present embodiment measuring color.

The color measuring unit 30 constituting part of the color measuring apparatus 20 includes a color measuring sensor 21, a color measuring sensor holder 33, a pressure spring 34, a color measuring carriage 22, a sliding member 23, a pressure plate 24, a slide shaft 25, a drying duct 27, a blower fan 28, and a color correction plate 29. The color measuring unit 30 internally houses the above member as a single unit, constituting a reading unit that is movable with respect to the paper discharge guide 14 which acts as a holder for a backing plate.

The color measuring sensor 21 is held by the color measuring sensor holder 33. The color measuring sensor 21 radiates light onto a color pattern (color patch) given as the measurement surface, and takes measurements of color information on the basis of the light that reflects off the color pattern and returns.

The color measuring sensor 21 includes two types of light sources: a first light source whose wavelength properties exhibit peak intensity in the 400 nm to 700 nm wavelength band, and a second light source whose wavelength properties exhibit peak intensity in the 370 nm to 410 nm wavelength band. The color measuring sensor 21 additionally includes one or multiple photosensors.

The second light source irradiates the measurement surface at an angle of 45 degrees with respect to the first light source. The color measuring sensor holder 33 is integrally formed with the sliding member 23 provided on the bottom, and is supported by the color measuring carriage 22. The pressure spring 34 is provided between the color measuring sensor holder 33 and the color measuring carriage 22, and by biasing the color measuring sensor holder 33 towards the pressure plate 24, a state of contact between the sliding member 23 and the pressure plate 24 is maintained. The color measuring carriage 22 is slidably supported along the slide shaft 25 and the pressure plate 24 extending in the sheet width direction. The pressure plate 24 is attached having a given stroke via hooking members 26, and has a slit 24b for measuring color in a color pattern. A drying duct 27 extending the sheet width direction and a blower fan 28 are provided downstream to the color measuring sensor 21 in the conveying direction. Air produced by the blower fan 28 is delivered into the drying duct 27, and the air blowing out from the drying duct 27 uniformly contacts the surface of the roll paper with a color pattern printed thereon, thus facilitating drying of the color pattern.

The paper discharge guide 14 is provided directly below the pressure plate 24 and tilted so as to be lower downstream in the conveying direction. A backing plate 41 is disposed on the paper discharge guide 14 at a position that faces the color measuring sensor 21. The backing plate 41 is for measuring color in a color pattern with high precision, by being placed on the underside of the color pattern to be measured on the roll paper 100. In the case where the color measuring unit 30 is in the retracted position illustrated in FIG. 2, the roll paper 100 is conveyed through a hole H between the pressure plate surface 24a and the paper discharge guide 14. By using color measuring unit driving means 31 to rotate the color measuring unit 30 about a color measuring unit axle 32 provided downstream to the color measuring sensor 21 in the conveying direction, it is possible to adjust the hole H between the pressure plate surface 24a and the paper discharge guide 14. During color measuring operation, the color measuring unit 30 is rotated by the color measuring unit driving means 31 and moved to the pressing position illustrated in FIG. 3, with both sides of the region read by the sensor pressing against the roll paper 100 due to the pressure plate surface 24a. Additionally, by scanning over the pressure plate 24 in the sheet width direction, the color measuring sensor 21 takes color measurements of a color pattern from the slit 24b while the sliding member 23 presses the roll paper 100 towards the backing plate 41 via the pressure plate 24. Also, the sliding member 23 is provided in upstream and downstream sections as close as possible to the color measuring part of the color measuring sensor 21, in order to maximally raise the precision of the distance between the surface of the roll paper 100 and the color measuring sensor 21.

Note that although the sliding member 23 in the present embodiment slides over the pressure plate 24, the sliding member 23 may also have a roller-shaped configuration.

The color correction plate 29 is provided at the edge of the pressure plate 24 in the sheet width direction. The color correction plate 29 is for correcting change over time in the color measuring sensor 21, and even during color measuring operations the color measuring sensor 21 frequently moves to a position facing the color correction plate 29 to conduct color correction. In this way, by having the color measuring unit 30 rotatably operate and by at least providing the pressing position illustrated in FIG. 3 and the retracted position illustrated in FIG. 2, it is possible to sufficiently ensure a conveying path for the roll paper 100.

Figure 4:
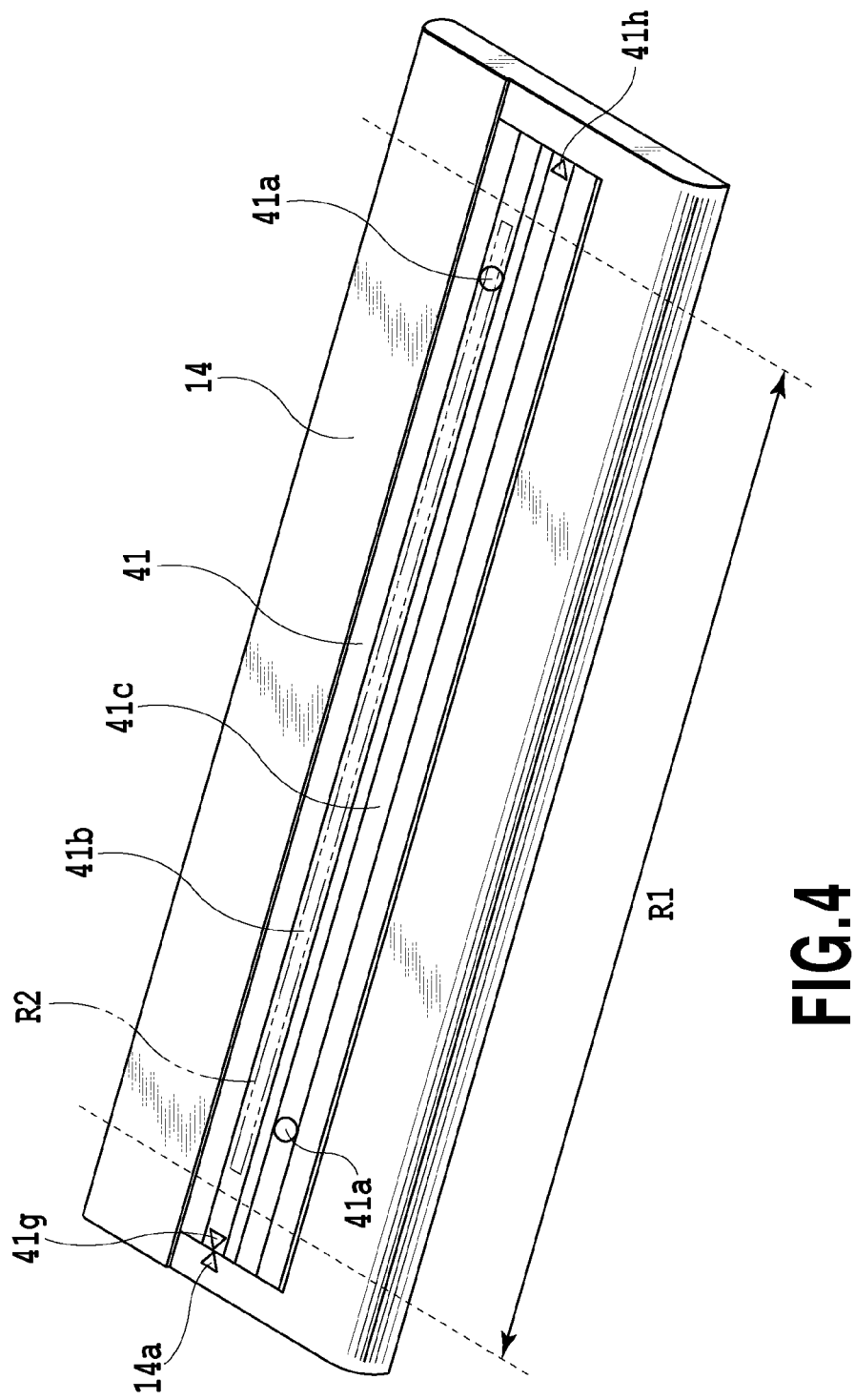
FIG. 4 is a diagram of a state in which a white backing plate is attached in a color measuring region.
Figure 5:
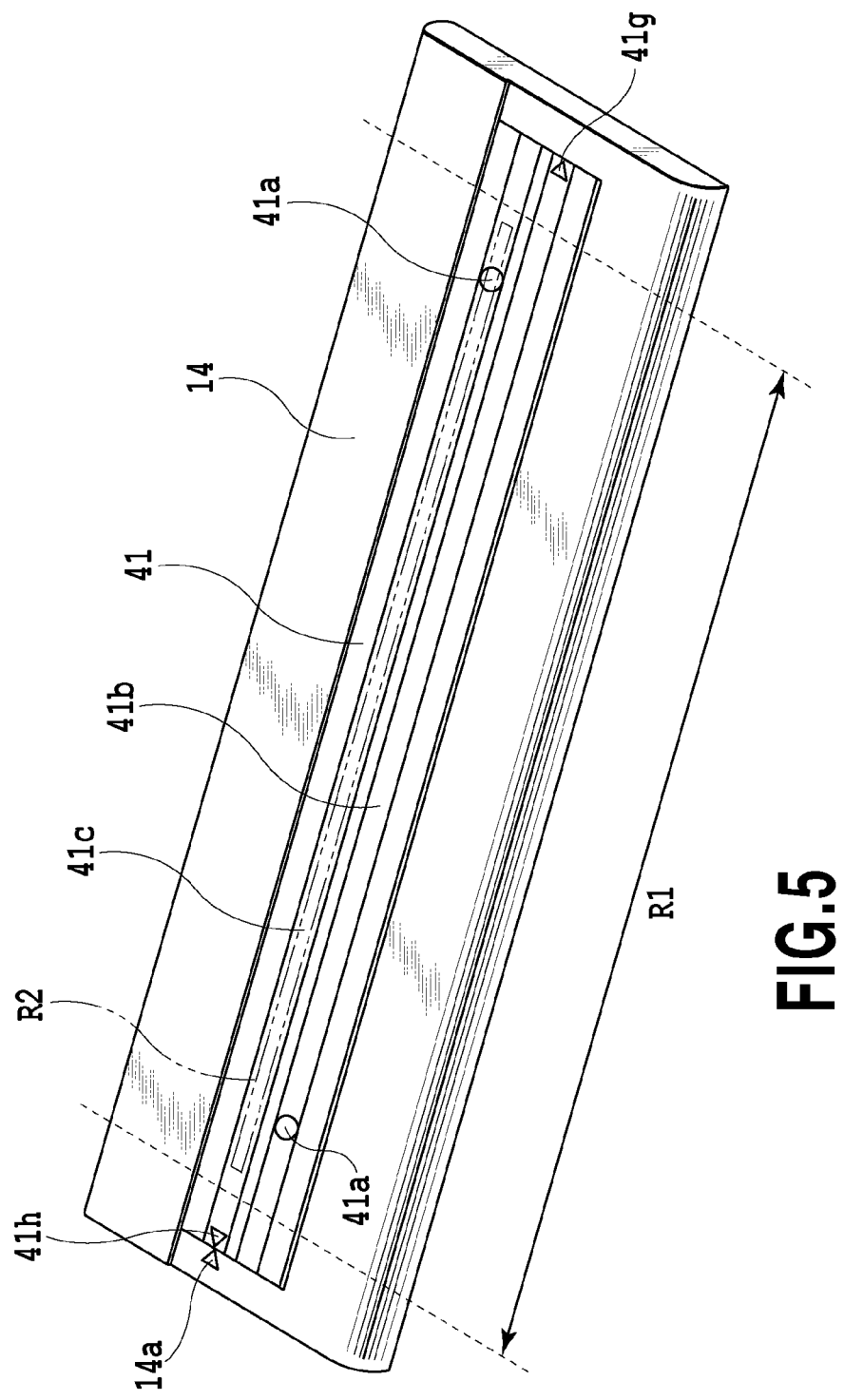
FIG. 5 is a diagram of a state in which a black backing plate is attached in a color measuring region.

FIG. 4 is a perspective diagram illustrating a paper discharge guide in a state where a white backing plate is attached in a color measuring region according to the present embodiment. FIG. 5 is a perspective diagram illustrating a paper discharge guide in a state where a black backing plate is attached in a color measuring region according to the present embodiment.

The backing plate 41 has an elongated shape along the movement direction of the color measuring carriage 22 which is larger than the paper conveying region R1 for the roll paper 100, and is detachably attached to the paper discharge guide 14. In other words, the backing plate is removably attached to the paper discharge guide 14, with the paper discharge guide 14 acting as a holder that supports the backing plate.

The backing plate 41 has a white or black color defined by an ISO standard, with a white portion 41b and a black portion 41c formed on the same side on the underside of the roll paper 100. By changing the attachment orientation with respect to the paper discharge guide 14, the backing plate 41 is able to changing between the white portion 41b and the black portion 41c facing a color measuring region R2 where measurements are taken with the color measuring sensor 2l. Also, a color measuring region mark 14a indicating the color measuring region is marked on the paper discharge guide 14, and similar color measuring region marks 41g and 41h are respectively marked in the white portion 41b and the black portion 41c.

Operation for changing between the white portion 41b and the black portion 41c attached to the color measuring region R2 will now be described. As illustrated in FIG. 4, in the case of disposing the white portion 41b in the color measuring region R2, the backing plate 41 is removed from the paper discharge guide 14, and attached to the paper discharge guide 14 while oriented with the white portion 41b upstream in the conveying direction and the black portion 41c downstream in the conveying direction. At this point, the color measuring region mark 14a of the paper discharge guide 14 and the color measuring region mark 41g of the white portion 41b are aligned at the same position.

Also, as illustrated in FIG. 5, in the case of disposing the black portion 41c in the color measuring region R2, the backing plate 41 is oriented with the black portion 41c upstream in the conveying direction and the white portion 41b downstream in the conveying direction while removed from the paper discharge guide 14, and is then attached to the paper discharge guide 14. At this point, the color measuring region mark 14a of the paper discharge guide 14 and the color measuring region mark 41h of the black portion 41c are aligned at the same position.

In this way, it is possible to attach the backing plate 41 to the paper discharge guide 14 with the relative upstream and downstream positions of the white portion 41b and the black portion 41c with respect to the conveying direction rotated by 180 degrees. Also, the backing plate 41 is shaped such that attachment to the paper discharge guide 14 is still possible after being rotated 180 degrees. Thus, the user is easily able to change between the white portion 41b and the black portion 41c. Also, by aligning the color measuring region marks, the attached state of the backing plate 41 may be ascertained at a glance. In the case of measuring color with the color measuring sensor 21, light from outside the inkjet printing apparatus 1 more easily enters closer to the delivery opening, and may potentially affect color measurements. For this reason, the color measuring region R2 is provided on the upstream side of the backing plate 41, and the position of the color measuring region R2 is placed as far inward into the inkjet printing apparatus 1 as possible.

The backing plate 41 includes backing color discriminators 41a for determining the attached state of the backing plate 41 on top of the white portion 41b and the black portion 41c, respectively. The backing color discriminators 41a are included inside the paper conveying region R1 of the roll paper 100, and are configured to directly measure the colors of the white portion 41b and the black portion 41c, whose colors are based on the respective ISO standards for white and black. Note that the backing color discriminators 41a disposed in the color measuring region R2 are provided near the standby position of the color measuring sensor 21 inside the paper conveying region R1. Providing backing color discriminators 41a inside the paper conveying region R1 in this way enables effective utilization of space inside the inkjet printing apparatus 1. Also, providing the backing color discriminators 41a disposed in the color measuring region R2 near the standby position of the color measuring sensor 21 enables shortening of the time required to determine the attached state of the backing plate 41.

Next, the relative heights of the color measuring sensor 21 and the backing plate 41 during color measuring operation will be described.

Figure 6:
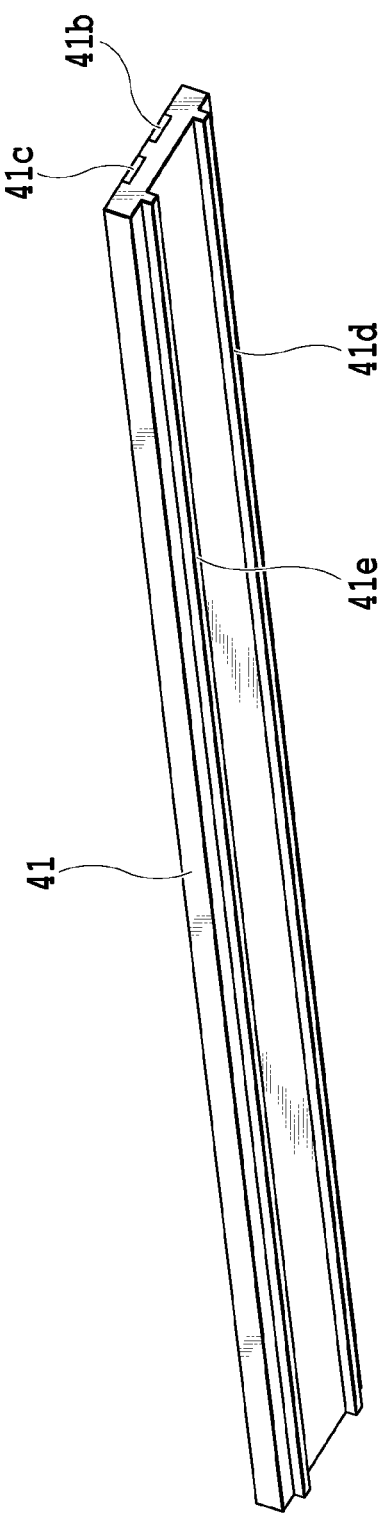
FIG. 6 is a diagram of a backing plate removed from a paper discharge guide.
Figure 7:
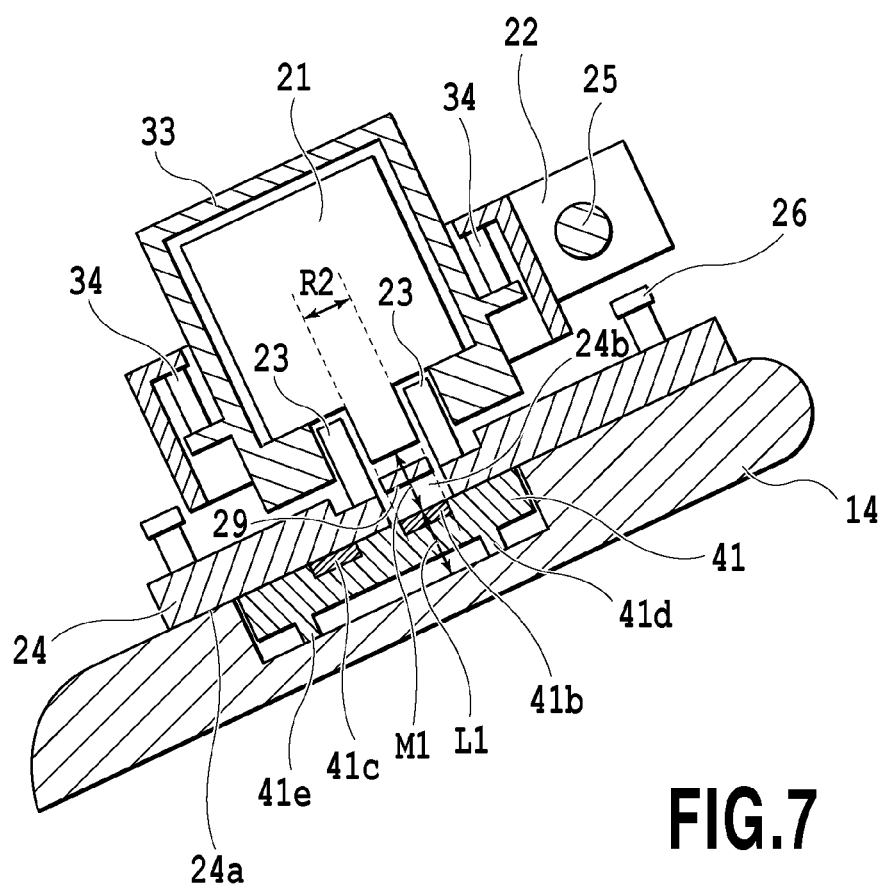
FIG. 7 is a diagram of a white portion attached in a color measuring region.
Figure 8:
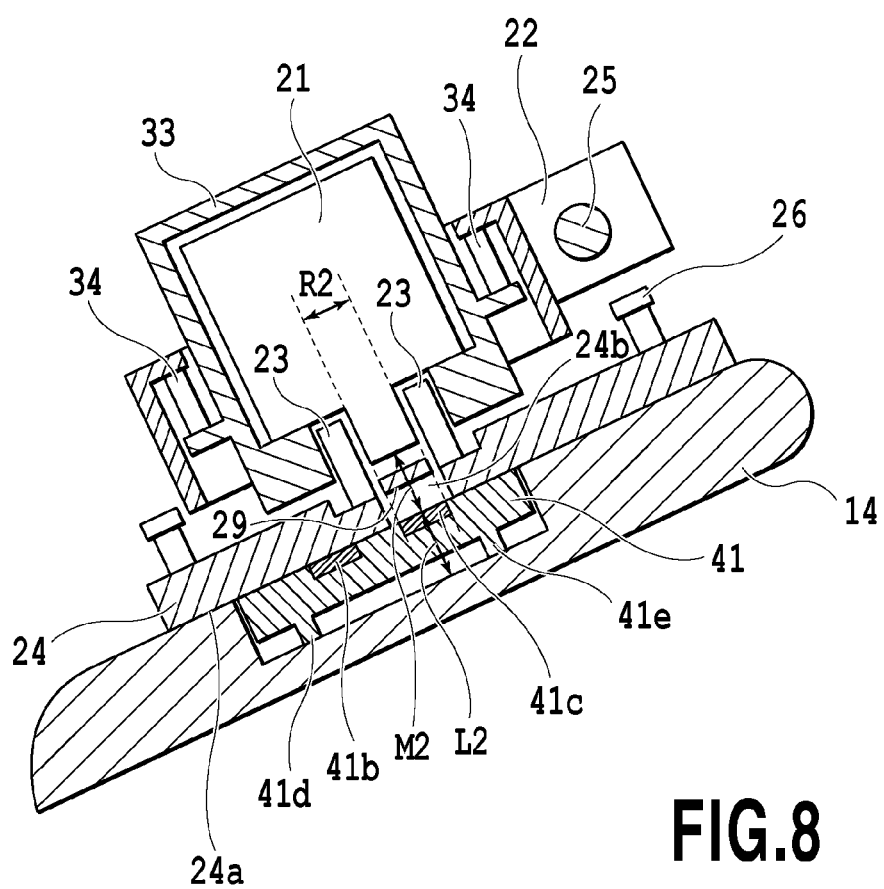
FIG. 8 is a diagram of a black portion attached in a color measuring region.

FIG. 6 is a perspective diagram illustrating a backing plate which has been removed from a paper discharge guide according to the present embodiment. FIG. 7 is a cross-section view schematically illustrating a state in which a white portion has been attached in the color measuring region of a color measuring apparatus according to the present embodiment. FIG. 8 is a cross-section view schematically illustrating a state in which a black portion has been attached in the color measuring region of a color measuring apparatus according to the present embodiment.

During color measuring operation, the color measuring sensor 21 scans over the pressure plate 24 in the sheet width direction and measures color in a color pattern. At this point, since the sliding member 23 scans in the sheet width direction while being pressed towards the pressure plate 24 by the pressure spring 34, the sliding member 23 holds the roll paper 100 between itself and the backing plate 41, and is able to prevent rising of the roll paper 100. Consequently, the distances (heights) M1 and M2 to the color measuring sensor 21 are determined, with the surface of the backing plate 41 underlaying the roll paper 100 as reference.

By keeping the distances M1 and M2 constant over the entire color measuring region R2, it is possible to measure color with high precision. Also, in order to measure color with high precision, it is necessary to keep the distances (heights) L1 and L2 of the surface of the backing plate 41 used as reference with respect to the paper discharge guide 14 constant over the entire color measuring region R2.

Herein, it is configured such that the white portion 41b when attaching the white portion 41b to the color measuring region R2 and the black portion 41c when attaching the black portion 41c exist in the same positions in the conveying direction even when the backing plate 41 is rotated 180 degrees and attached.

It is also configured such that the heights L1 and L2 with respect to the paper discharge guide illustrated in FIGS. 7 and 8 are equal. Thus, since the distances (heights) M1 and M2 may be kept constant without changing the relative position of the surface of the backing plate 41 used as a reference during color measurement, it is possible to take consistent, high-precision measurements.

Also, the backing plate 41 used as a reference during color measurement is pressed towards the paper discharge guide 14 due to the pressing force of the sliding member 23 that acts as a pressing unit, and may bend in some cases. If the backing plate 41 bends, the distance between the surfaces of the color measuring sensor 21 and the roll paper 100 will vary, making high-precision measurement impossible.

Consequently, the backing plate 41 is equipped with supports 41d and 41e that contact the paper discharge guide 14 and provide support, as illustrated in FIG. 6. These supports 41d and 41e are provided continuously on the outer side of the paper conveying region R1 in the sheet width direction. Thus, even if the backing plate 41 is pressed by the sliding member 23 that acts as a pressing unit, the supports 41d and 41e contact the paper discharge guide 14 and provide support. Also, providing the supports 41d and 41e continuously on the outer side of the paper conveying region R1 makes it possible to support the backing plate 41 over the entire color measuring region R2 and reduce bending, even when the sliding member 23 scans in the sheet width direction.

Also, the supports 41d and 41e are disposed at two locations: a position facing the sliding member 23 on the upstream side in the conveying direction when the backing plate 41 is attached to the paper discharge guide 14, and a position downstream in the conveying direction from a position facing the sliding member 23 on the downstream side in the conveying direction. As illustrated in FIG. 7, in the case where the white portion 41b is in the color measuring region R2, the support 41d is disposed in the position facing the sliding member 23 on the upstream side in the conveying direction, while the support 41e is disposed in the position downstream in the conveying direction from a position facing the sliding member 23 on the downstream side in the conveying direction. Also, as illustrated in FIG. 8, in the case where the black portion 41c is in the color measuring region R2, the support 41e is disposed in the position facing the sliding member 23 on the upstream side in the conveying direction, while the support 41d is disposed in the position downstream in the conveying direction from a position facing the sliding member 23 on the downstream side in the conveying direction.

In other words, the supports 41d and 41e are disposed in the same relative positions even when changing between the white portion 41b and the black portion 41c in the color measuring region R2. For this reason, the support 41d or the support 41e is disposed in a position facing the sliding member 23 on the upstream side in the conveying direction for the case of both the white portion 41b and the black portion 41c. Thus, the backing plate 41 is able to reliably withstand pressing force received from the sliding member 23 at the facing positions.

The overall backing plate 41 is realized with white material within the ISO standard used for the white portion 41b, with black color within the ISO standard for the black portion 41c printed onto the backing plate 41. Using a white material as the base minimizes the effects of tonal change in the color of the black portion 41c. Since the above is also a configuration less likely to produce unevenness in the sheet surface of the roll paper 100, consistent sheet conveying is possible. Applying a coating with a coating material over the white portion 41b and the black portion 41c prevents damage or peeling of the print. Since the white portion 41b and the black portion 41c are provided on the same face, a coating may be applied simultaneously.

Note that the white portion 41b and the black portion 41c may also be painted on, realized by two color molding with a resin, or divided into separate members and embedded into the backing plate 41. Also, although the backing plate 41 is described as having a unitary configuration in the present embodiment, the backing plate 41 may also be divided in the sheet width direction.

Figure 9:
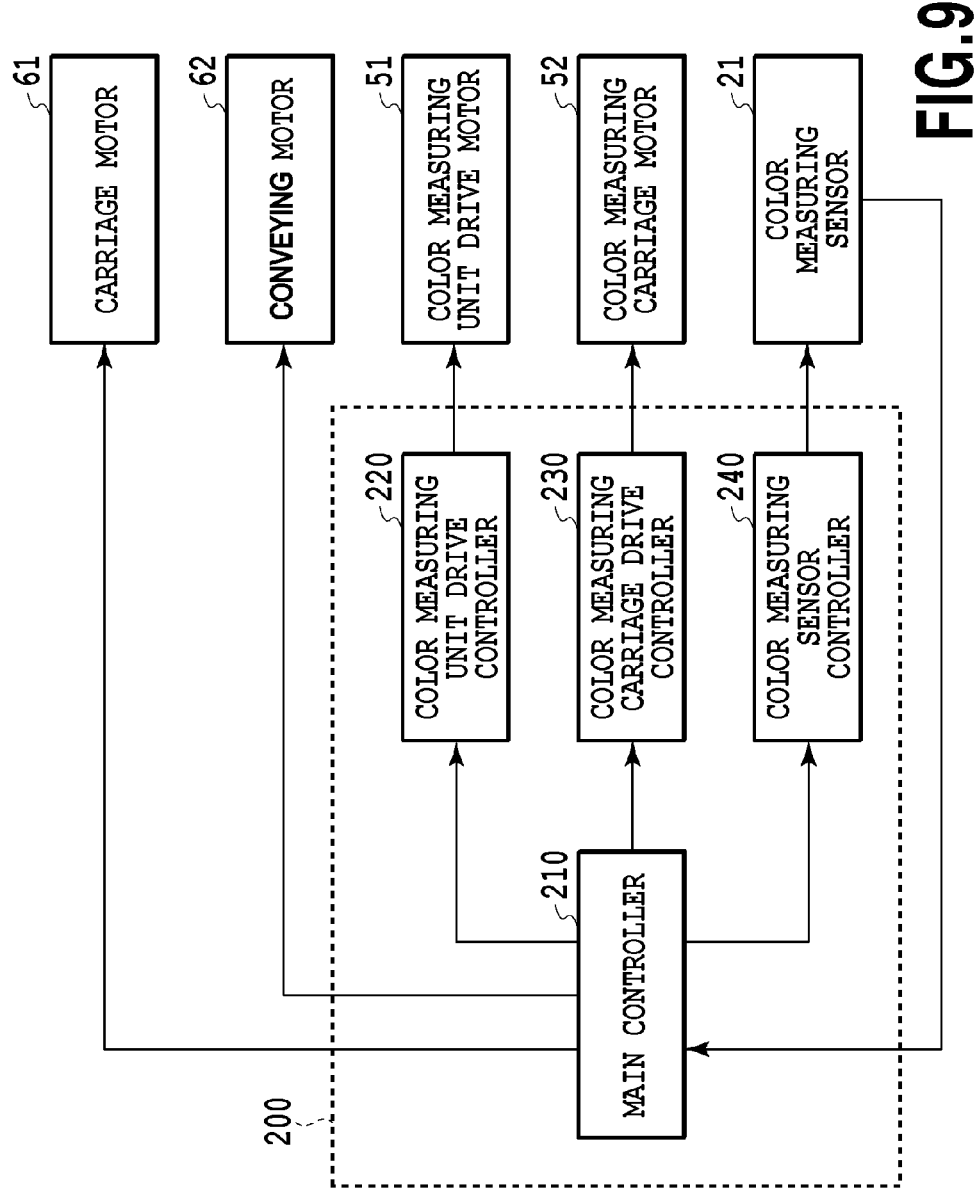
FIG. 9 is a block diagram illustrating a controller of an inkjet printing apparatus.

Next, FIG. 9 is a block diagram illustrating a controller of an inkjet printing apparatus equipped with a color measuring apparatus according to the present embodiment.

The controller 200 is a component for realizing control over a carriage motor 61, a conveying motor 62, a color measuring unit drive motor 51, a color measuring carriage motor 52, and the color measuring sensor 21. The controller 200 is equipped with components such as CPU, ROM, RAM, and motor drivers that are not illustrated, and includes a main controller 210, a color measuring unit drive controller 220, a color measuring carriage drive controller 230, and a color measuring sensor controller 240. The main controller 210 issues instructions to the color measuring unit drive controller 220, the color measuring carriage drive controller 230, and the color measuring sensor controller 240. The color measuring unit drive controller 220 controls the position of the color measuring unit 30 by controlling the color measuring unit drive motor 51. The color measuring carriage drive controller 230 controls the position of the color measuring sensor 21 by controlling the color measuring carriage motor 52. The color measuring sensor controller 240 measures color information at a given position by controlling the color measuring sensor 21, and feeds back the results to the main controller 210.

Figure 10:
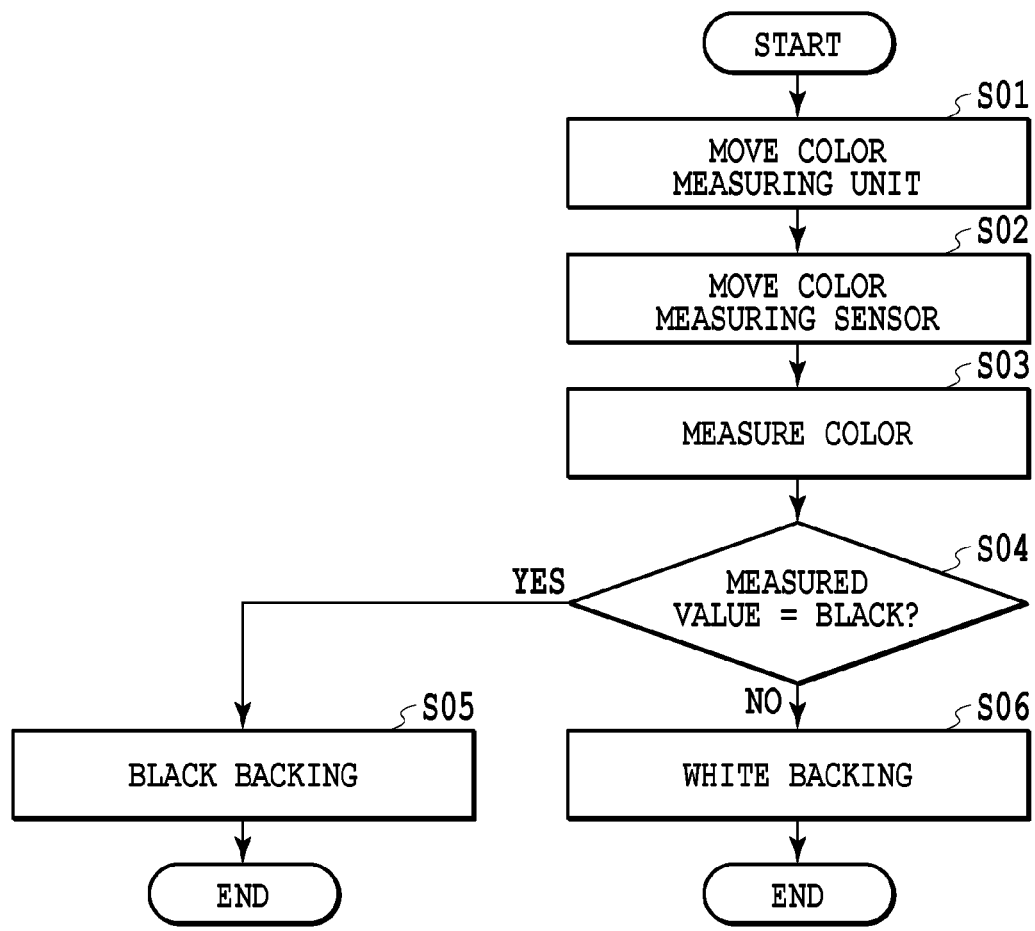
FIG. 10 is a flowchart for determining which backing plate is attached.

FIG. 10 is a flowchart illustrating means for determining the attached state of a backing plate in a color measuring apparatus of the present embodiment.

When the determination of the attached state of the backing plate 41 is performed, the color measuring unit 30 is moved to a pressing position by the color measuring unit driving means 31 (step S01). Also, the color measuring sensor 21 is moved to the backing color discriminator 41a disposed in the color measuring region R2 (step S02). After that, color is measured in the backing color discriminator 41a by the color measuring sensor 21 (step S03). Since the color measuring sensor 21 directly measures color in the white portion 41b or the black portion 41c itself, color measurement results are obtained for white if the white portion 41b is attached in the color measuring region R2, and for black if the black portion 41c is attached.

From the results of measuring color in the backing color discriminator 41a (step S03), the measured value is used to determine whether the color is black or white (step S04). The attached state of the backing plate 41 is then determined to be the black backing (step S05) or the white backing (step S06). The determination of the attached state of the backing plate is performed together with color measuring operation before printing an image, or after replacing the backing plate 41. Thus, it is possible to confirm the attached state of the backing plate 41 and prevent mistaken backing plate color.

In the present embodiment as above, a white portion and a black portion is formed on the same face of a backing plate. Additionally, it is possible to attach the backing plate to a paper discharge guide that acts as a holder in different orientations, such that either the white portion or the black portion faces a sensor, depending on the orientation of the backing plate attached to the holder. Thus, it is possible to easily change between the white portion 41b and the black portion 41c. Also, since it is possible to keep the unused portion of the backing plate while remaining attached to the paper discharge guide 14, it is possible to reduce warping of the backing plate 41. Furthermore, by providing supports 41d and 41e, it is possible to reduce bending of the backing plate 41 and perform high-precision measurement. Moreover, by providing backing color discriminators 41a, it is possible to determine the attached state of the backing plate 41.

(Second Embodiment)

In the first embodiment, bending of the backing plate 41 is reduced by providing the backing plate 41 with the two supports 41d and 41e. However, a support according to the present invention is not limited to such an embodiment.

Figure 11:
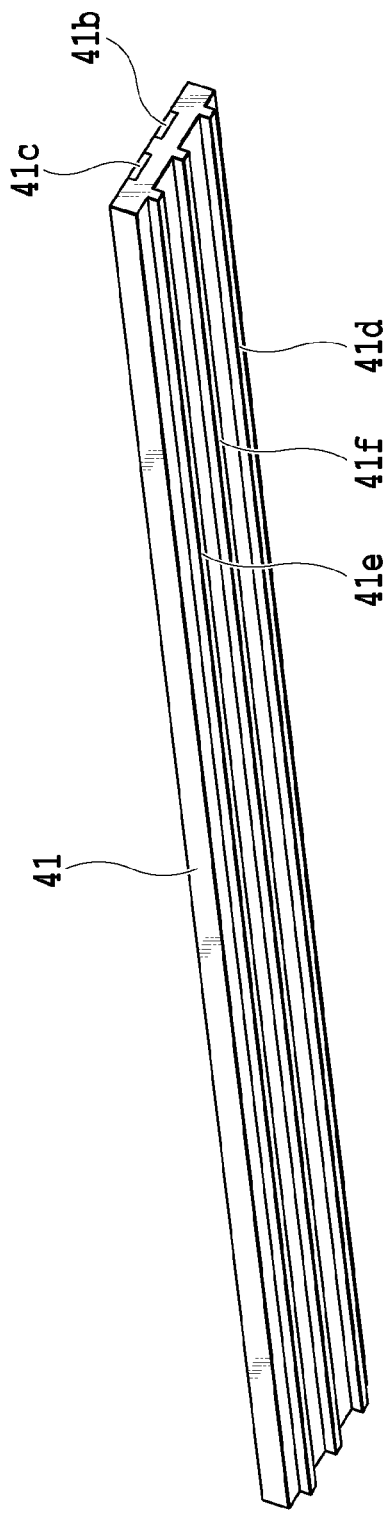
FIG. 11 is a diagram of a backing plate removed from a paper discharge guide according to the second embodiment.

FIG. 11 is a perspective diagram illustrating a backing plate which has been removed from a paper discharge guide according to the present embodiment.

The backing plate 41 includes supports 41d, 41e, and 41f that contact the paper discharge guide 14 and provide support. The supports 41d, 41e, and 41f are provided continuously on the outer side of the paper conveying region R1 in the sheet width direction. The supports 41d, 41e, and 41f are provided at three locations: a position facing the sliding member 23 on the upstream side in the conveying direction when the backing plate 41 is attached to the paper discharge guide 14, a position facing the sliding member 23 on the downstream side in the conveying direction, and a position farther downstream in the conveying direction. Consequently, the backing plate 41 is pressed towards the paper discharge guide 14 by the pressing force of the sliding member 23, and thus bending may be reduced.

Figure 12:
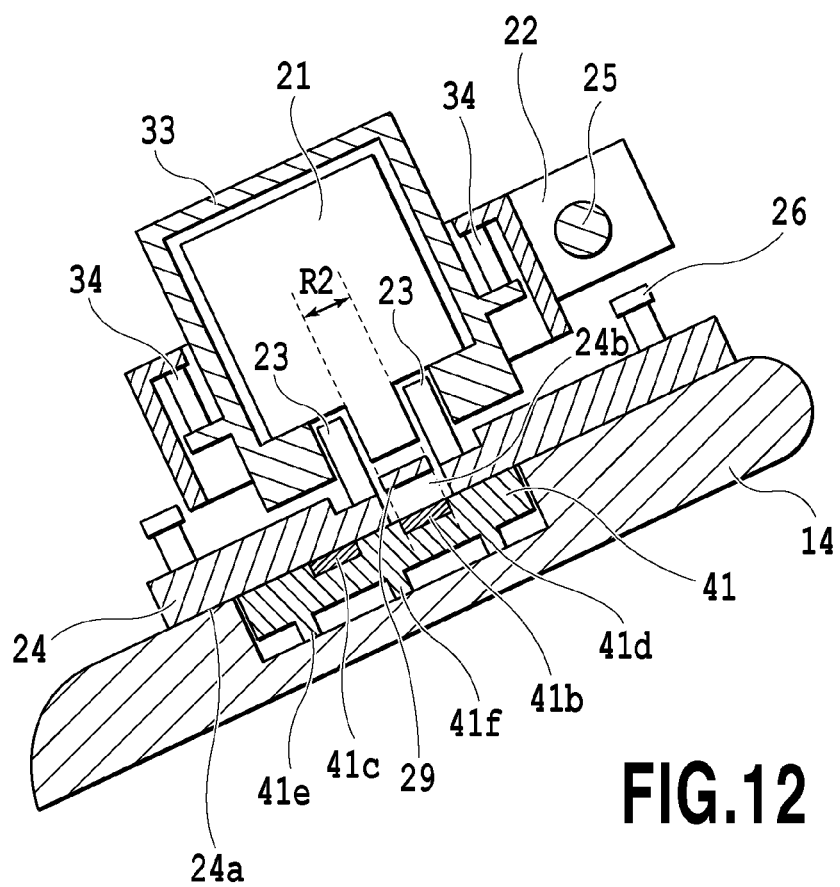
FIG. 12 is a diagram of a state in which a white backing plate is attached in a color measuring region.

FIG. 12 is a cross-section view schematically illustrating a state in which a white backing has been attached in the color measuring region of a color measuring apparatus according to the present embodiment.

In the case where the white portion 41b is in the color measuring region R2, the support 41d is disposed in the position facing the sliding member 23 on the upstream side in the conveying direction, the support 41f is disposed in the position facing the sliding member 23 on the downstream side in the conveying direction, and the support 41e is disposed in the position farther downstream in the conveying direction.

Figure 13:
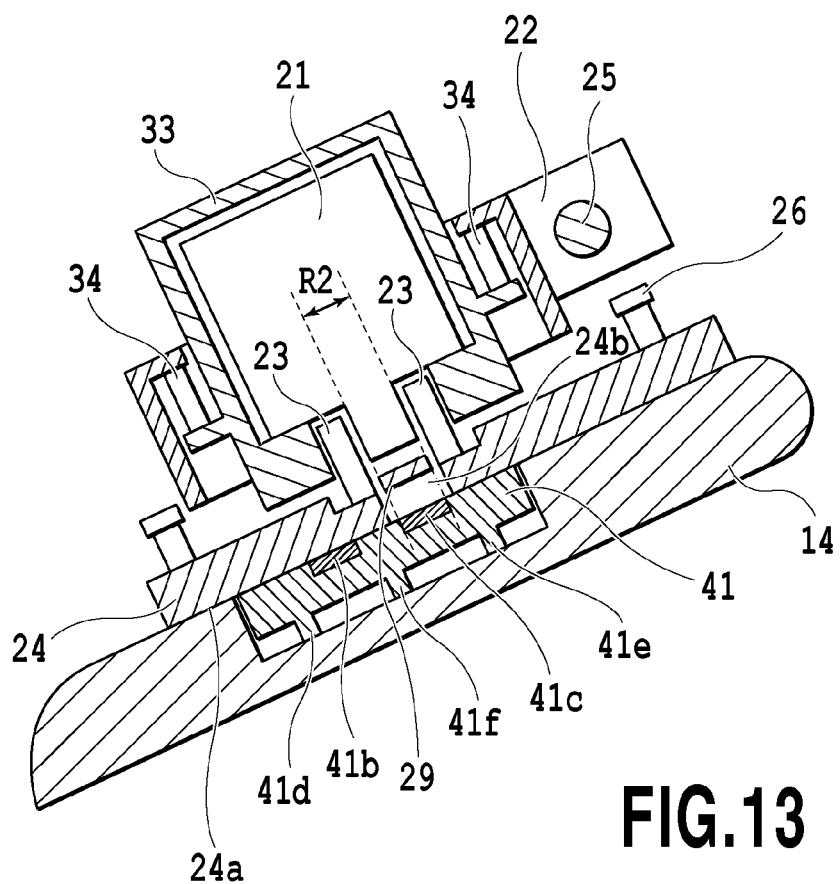
FIG. 13 is a diagram of a state in which a black backing plate is attached in a color measuring region.

FIG. 13 is a cross-section view schematically illustrating a state in which a black backing has been attached in the color measuring region of a color measuring apparatus according to the present embodiment.

In the case where the black portion 41c is in the color measuring region R2, the support 41e is disposed in the position facing the sliding member 23 upstream in the conveying direction, the support 41f is disposed in the position facing the sliding member 23 downstream in the conveying direction, and the support 41d is disposed in the position farther downstream in the conveying direction. In other words, the supports 41d, 41e, and 41f are disposed in the same relative positions even when changing between the white portion 41b and the black portion 41c in the color measuring region R2. For this reason, the support 41d or the support 41e is disposed in a position facing the sliding member 23 on the upstream side in the conveying direction for the case of both the white portion 41b and the black portion 41c. Also, the support 41f is always disposed in the position facing the sliding member 23 on the downstream side in the conveying direction. Thus, the backing plate 41 is able to able to reliably withstand pressing force received from the sliding member 23 at the facing positions.

Note that although there are three locations for supports according the present embodiment, the present invention is not limited to two locations or three locations, and supports may also be provided at many locations.

As described above, by providing supports 41d, 41e, and 41f, it is possible to reduce bending of the backing plate 41 and conduct high-precision measurement.

(Third Embodiment)

With the backing plate according to the first embodiment, a white portion and a black portion are formed on a single face, and the roles of a white backing and a black backing are fulfilled with a single backing plate according to the attachment orientation of the backing plate. However, the present invention is not limited to a backing plate provided with backing portions for two colors on a single face.

Figure 14:
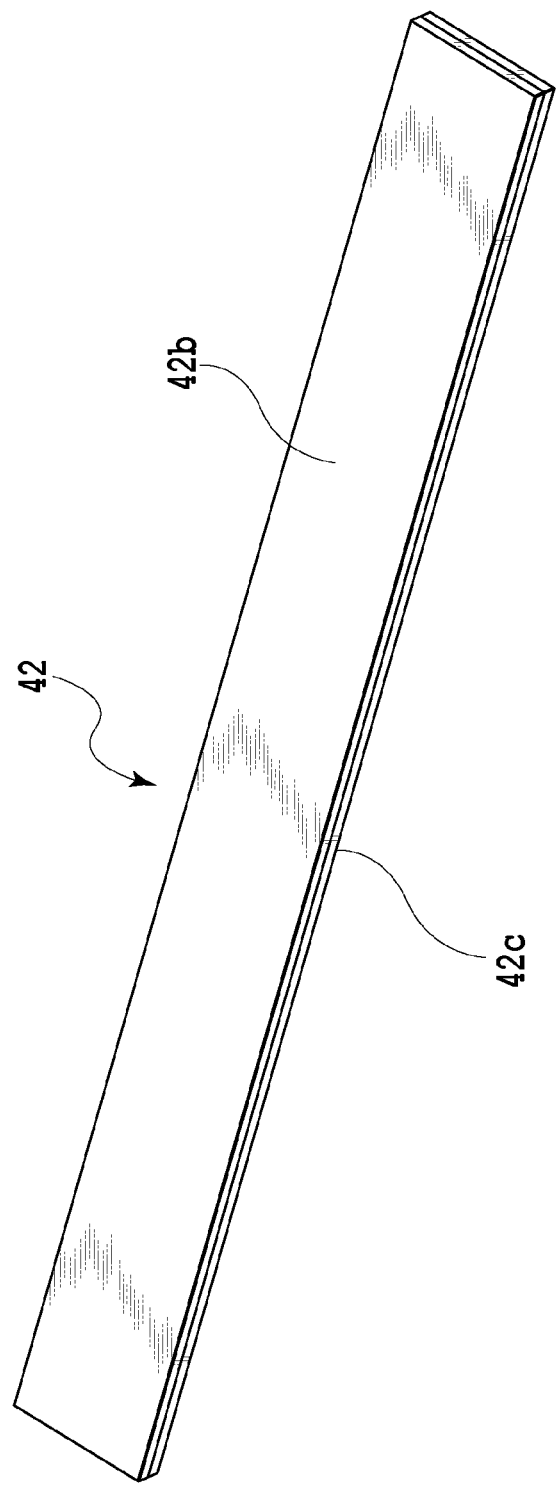
FIG. 14 is a diagram of a backing plate removed from a paper discharge guide according to the third embodiment.

FIG. 14 is a perspective diagram illustrating a backing plate which has been removed from a paper discharge guide according to the present embodiment.

On the backing plate 42, a white portion 42b is formed on a front face (first face), and a black portion 42c is formed on a back face (second face). In other words, the backing plate according to the present embodiment is equipped with differently colored backing portions on its front and back.

By changing the attached direction of the backing plate 42, it is possible to change between the white portion 42b and the black portion 42c disposed in the color measuring region R2 where the color measuring sensor 21 takes measurements.

Figure 15:
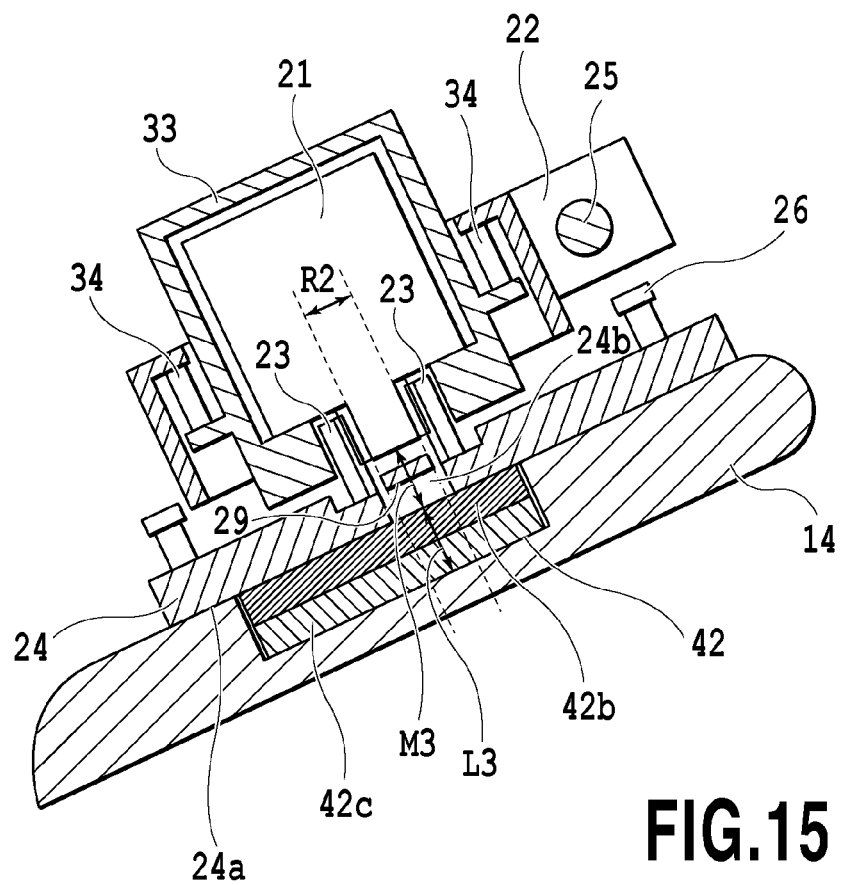
FIG. 15 is a diagram of a state in which a white backing plate is attached in a color measuring region.

FIG. 15 is a cross-section view schematically illustrating a state in which a white backing has been attached in the color measuring region of a color measuring apparatus according to the present embodiment.

In the case of disposing the white portion 42b in the color measuring region R2, the backing plate 42 is removed from the paper discharge guide 14, and attached to the paper discharge guide 14 such that the white portion 42b is disposed on the underside of the roll paper 100.

Figure 16:
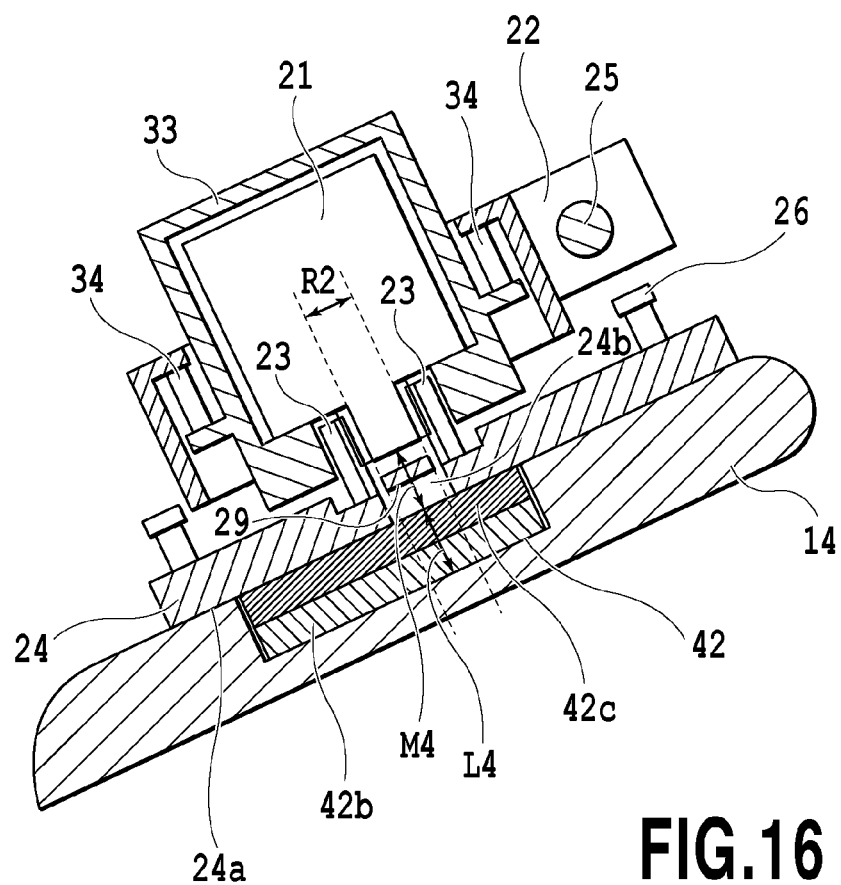
FIG. 16 is a diagram of a state in which a black backing plate is attached in a color measuring region.

FIG. 16 is a cross-section view schematically illustrating a state in which a black backing has been attached in the color measuring region of a color measuring apparatus according to the present embodiment.

In the case of disposing the black portion 42c in the color measuring region R2, the backing plate 42 is removed from the paper discharge guide 14, and attached to the paper discharge guide 14 such that the black portion 42c is disposed on the underside of the roll paper 100.

In this way, the backing plate 42 has a reversible structure able to be attached to the paper discharge guide 14 with the white portion 42b and the black portion 42c on the front and back faces turned over. The backing plate 42 is shaped such that attachment to the paper discharge guide 14 is still possible after being turned over. Thus, the user is easily able to change between the white portion 42b and the black portion 42c.

Also, it is configured such that the white portion 42b when attaching the white portion 42b to the color measuring region R2 and the black portion 42c when attaching the black portion 42c exist in the same positions in the conveying direction even when the backing plate 41 is turned over and attached. It is also configured such that the heights L3 and L4 with respect to the paper discharge guide illustrated in FIGS. 15 and 16 are equal. Thus, since the heights (distances) M3 and M4 may be kept constant without changing the relative position of the surface of the backing plate 42 used as a reference during color measurement, it is possible to take consistent, high-precision measurements.

In this way, in the present embodiment, a white portion is formed on a first face of a backing plate, and a black portion is formed on a second face on the opposite side of the first face. Additionally, it is possible to reversibly attach the backing plate to a paper discharge guide that acts as a holder, such that either the white portion or the black portion faces a sensor, depending on the front or back state of the backing plate attached to the holder. Thus, it is possible to easily change between the white portion 42b and the black portion 42c, and in addition, since it is possible to keep the unused portion of the backing plate while remaining attached to the paper discharge guide 14, it is possible to keep the backing plate 42 from becoming dirty or damaged and reduce bending of the backing plate 42.

Although foregoing thus describes the case of being used in an inkjet printing apparatus, the present invention is not limited to being used in an inkjet printing apparatus, and may also be applied to printing apparatus that conduct color printing by electrophotographic methods, thermal methods, and various other printing methods.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-071291, filed Mar. 27, 2012, which is hereby incorporated by reference herein in its entirety.

What is claimed is:

1. A color measuring apparatus, comprising:
a backing plate having a white portion and a black portion;
a holder on which the backing plate is capable of being attached;
a measuring unit configured to measure color patterns on a sheet placed on the backing plate, wherein the measuring unit includes a sensor, a carriage holding the sensor and moveable with respect to the color patterns, and a pressure plate on which the carriage moves; and
a mechanism configured to shift the measuring unit with respect to the holder to press the pressure plate against the holder while sandwiching the sheet therebetween,
wherein, in accordance with an attached state of the backing plate on the holder, the sensor in the measuring unit faces either one of the white portion and the black portion through the sheet when measuring.

2. The color measuring apparatus according to claim 1, wherein the holder has a flat surface and a groove provided in the flat surface in which the backing plate is inserted, a surface of the backing plate has the same height as the flat surface, and the pressure plate presses the flat surface of the holder and the surface of the backing plate at the same time when measuring.

3. The color measuring apparatus according to claim 1, wherein
the surface of the white portion in the case where the white portion faces the sensor is at the same height with respect to the holder as the surface of the black portion in the case where the black portion faces the sensor.

4. The color measuring apparatus according to claim 1, wherein
the white portion and the black portion are formed on the same face of the backing plate, and
the backing plate is attachable to the holder in different orientations, such that either one of the white portion and the black portion faces the sensor.

5. The color measuring apparatus according to claim 1, wherein
the white portion is formed on a first face of the backing plate, and the black portion is formed on a second face on the opposite side of the first face, and
the backing plate is reversibly attachable to the holder, such that either one of the white portion and the black portion faces the sensor.

6. A printing apparatus, comprising:
a printing unit that prints an image; and
a color measuring apparatus according to claim 1 that measures color patterns printed by the printing unit.

* * * * *